United States Patent [19]

Iijima

[11] Patent Number: 5,174,920
[45] Date of Patent: Dec. 29, 1992

[54] LIQUID CRYSTAL DISPLAY DEVICE
[75] Inventor: Chiyoaki Iijima, Suwa, Japan
[73] Assignee: Seiko Epson Corporation, Tokyo, Japan
[21] Appl. No.: 500,658
[22] Filed: Mar. 28, 1990

[30] Foreign Application Priority Data
Mar. 28, 1989 [JP] Japan .................... 1-76113

[51] Int. Cl.⁵ .................... C09K 19/52; C09K 19/30; G02F 1/13
[52] U.S. Cl. .................... 252/299.01; 252/299.63; 252/299.66; 359/103
[58] Field of Search ............... 350/350 R; 252/299.66, 252/299.63, 299.67; 359/103, 81

[56] References Cited
U.S. PATENT DOCUMENTS

| | | | |
|---|---|---|---|
| 4,362,771 | 12/1982 | Umeda et al. | 428/1 |
| 4,483,595 | 11/1984 | Irving et al. | 350/350 R |
| 4,502,974 | 3/1985 | Sugimori et al. | 252/299.63 |
| 4,550,981 | 11/1985 | Petrzilka et al. | 350/350 R |
| 4,662,162 | 7/1987 | Kimura et al. | 252/299.5 |
| 4,698,176 | 10/1987 | Gray et al. | 252/299.61 |
| 4,701,547 | 10/1987 | Sugimori et al. | 560/102 |
| 4,704,005 | 10/1987 | Boller et al. | 350/346 |
| 4,844,569 | 7/1989 | Wada et al. | 350/347 |
| 4,877,547 | 10/1989 | Weber et al. | 252/299.61 |
| 4,886,621 | 12/1989 | Sage et al. | 252/299.61 |
| 4,902,108 | 2/1990 | Byker | 350/357 |
| 4,909,605 | 3/1990 | Asano et al. | 350/346 |
| 4,909,606 | 3/1990 | Wada et al. | 350/347 |
| 4,913,530 | 4/1990 | Ichimura et al. | |
| 4,913,532 | 4/1990 | Yoshida et al. | 350/350 R |
| 4,923,632 | 5/1990 | Sawada et al. | 252/299.61 |

FOREIGN PATENT DOCUMENTS

| | | |
|---|---|---|
| 1136843 | 12/1982 | Canada .................... 350/350 R |
| 0056113 | 7/1982 | European Pat. Off. . |
| 0087102 | 8/1983 | European Pat. Off. . |
| 0176039 | 4/1986 | European Pat. Off. . |
| 0194879 | 9/1986 | European Pat. Off. . |
| 0232052 | 8/1987 | European Pat. Off. . |
| 0258868 | 3/1988 | European Pat. Off. . |
| 3606153 | 8/1987 | Fed. Rep. of Germany . |
| 61-60113 | 10/1978 | Japan . |
| 63-254421 | 10/1988 | Japan .................... 350/350 R |
| 78100112 | 9/1990 | Taiwan . |
| 77101258 | 12/1990 | Taiwan . |

Primary Examiner—Robert L. Stoll
Assistant Examiner—C. Harris
Attorney, Agent, or Firm—Blum Kaplan

[57] ABSTRACT

A liquid crystal display device including a super twisted nematic liquid crystal material with a twist angle between about 180° and 360°. The liquid crystal composition includes at least one of a compound [I] and a compound [II] for lowering the threshold voltage and at least one of a compound [III] and a compound [IV] for widening the d/p range and improving Δ(d/p). Compounds [I]–[IV] are represented by the general formulae:

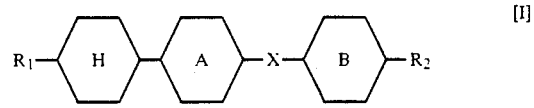

[I]

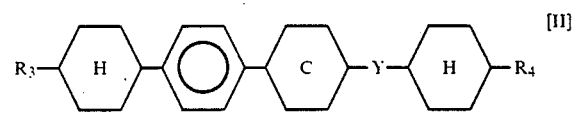

[II]

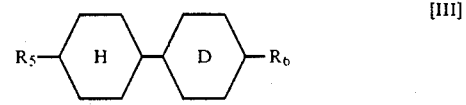

[III]

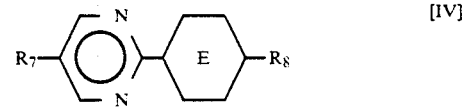

[IV]

wherein $R_1$ is R—, RO— or RCH=CH—, $R_2$ is R—, RO—, CN— or F—,

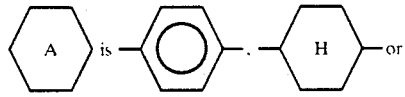

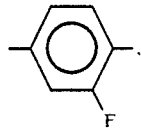

X is a single covalent bond, —C≡C—, —CH$_2$CH$_2$— or —COO—,

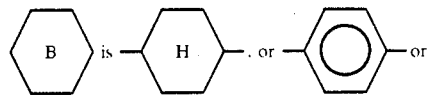

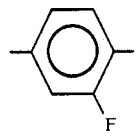

if X is not —CH$_2$CH$_2$—; R$_3$ is R—, RO— or RCH=CH—, R$_4$, R$_5$ and R$_7$ are R— or RO—, Y is a single covalent bond or —CH$_2$CH$_2$—,

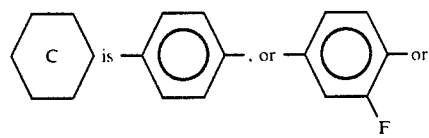

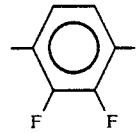

if Y is a single covalent bond,

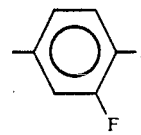

R$_6$ is —CN or —F,

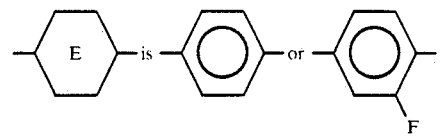

and R$_8$ is —F, or —CN if

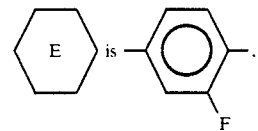

and R is an alkyl group having from 1 to 9 carbon atoms. The composition includes at least 20 weight percent of compounds [I] and compounds [II] and between about 5 and 55 weight percent of compounds [III] and compounds [IV].

2 Claims, 3 Drawing Sheets

LIQUID CRYSTAL DISPLAY DEVICE

BACKGROUND OF THE INVENTION

This invention relates to a liquid crystal display device, and more particularly to a display including a super twisted nematic liquid crystal composition.

Conventional super-twisted nematic liquid crystal display devices often suffer from discrimination lines and fingerprints. In super twisted nematic liquid crystal display devices, the ratio d/p of layer thickness (d) to spiral pitch (p) of the liquid crystal material is related to the twist angle ($\phi$) of the liquid crystal material.

Japanese Patent Laid-Open No. 62-194224 discloses the possible range of d/p for normal operation as:

$$\phi/360 - \frac{1}{4} < d/p < \phi/360$$

for a display device which does not suffer from discrimination lines or fingerprints. However, the range of d/p is reduced to less than one-half of the range defined by the above formula due to the scattering of layer thickness (d) and the variation of spiral pitch (p) of the liquid crystal material when the display device is mass produced and due to fluctuation of d/p from changes in temperature and the like. In particular, the range of d/p is narrowed markedly as the twist angle ($\phi$) of the liquid crystal material is increased. Accordingly, for practical mass production, the twist angle ($\phi$) of liquid crystal material has a limit of about 230°.

It is desirable to add at least one compound having high dielectric anisotropy to reduce the threshold voltage. However, when at least one compound is included having the general formula

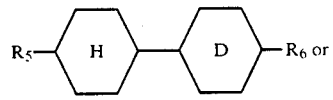

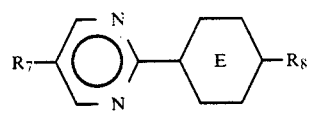

wherein $R_5$ and $R_7$ are R— or RO—,

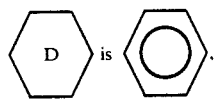

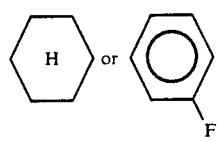

$R_6$ is —CN or —F,

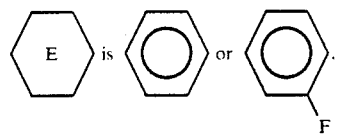

and $R_8$ is —F, or —CN if

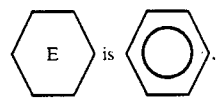

which have high dielectric anisotropy and are effective for reducing threshold voltage, domains tend to form and the liquid crystal material has an extremely narrow d/p range.

Accordingly, it is desirable to provide a liquid crystal display device which does not suffer from these shortcomings of the prior art displays.

SUMMARY OF THE INVENTION

Generally speaking, in accordance with the invention, an improved super twisted nematic liquid crystal display device is provided. The display device includes a liquid crystal cell including a liquid crystal material disposed between a pair of electrode substrates. A plurality of spacers are positioned between the substrates. A polarizing plate is disposed on each side of the liquid crystal cell. The twist angle of the liquid crystal is between about 180° and 360°.

The liquid crystal material is a nematic liquid crystal composition including at least one of a compound [I] and a compound [II] for widening the d/p range and improving $\Delta$(d/p) and at least one of a compound [III] and a compound [IV] for lowering the threshold voltage. Compound [I] is represented by the general formula:

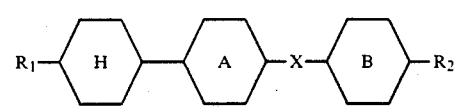

wherein $R_1$ is R—, RO— or RCH=CH—, $R_2$ is R—, RO—, CN— or F—,

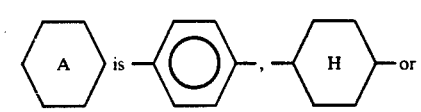

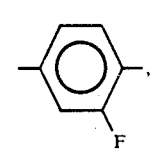

X is a single covalent bond, —C≡C—, —CH$_2$CH$_2$— or —COO—,

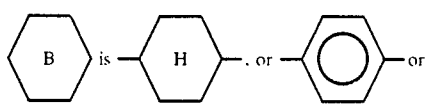

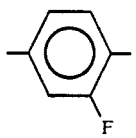

if X is not —CH$_2$CH$_2$—; and R is a linear alkyl group having from 1 to 9 carbon atoms. Compound [II] is represented by the general formula:

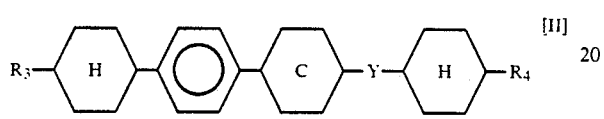

[II]

wherein R$_3$ is R—, RO— or RCH=CH—, R$_4$ is R— or RO—, Y is a single covalent bond or —CH$_2$CH$_2$—,

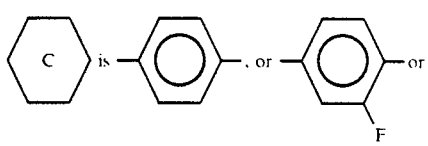

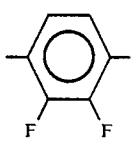

if Y is a single covalent bond, and R is a linear alkyl group having from 1 to 9 carbon atoms. Compound [III] is represented by the general formula:

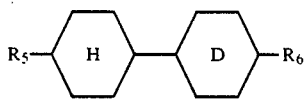

[III]

wherein R$_5$ is R— or RO—,

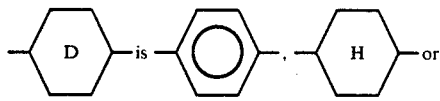

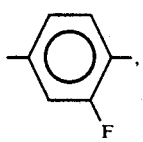

R$_6$ is —CN or F, and R is an alkyl group having from 1 to 9 carbon atoms. Compound [IV] is represented by the general formula:

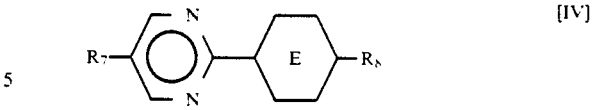

[IV]

wherein R$_7$ is R— or RO—,

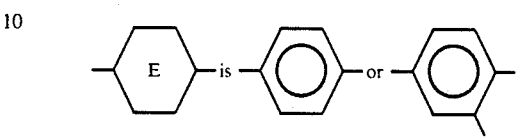

and R$_8$ is —F, or —CN if

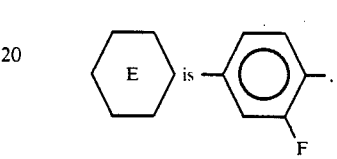

and R is an alkyl group having from 1 to 9 carbon atoms. The composition includes at least 20 weight percent of the total of compounds [I] and compounds [II] between about 5 and 55 weight percent of the total of compounds [III] and compounds [IV].

Accordingly, it is an object of this invention to provide an improved liquid crystal display device.

Another object of the invention is to provide an improved liquid crystal display device having a wide d/p range.

A further object of the invention is to provide an improved liquid crystal display device having low dependence of d/p on temperature.

Still another object of the invention is to provide a super twisted liquid crystal display having a twisted angle greater than 240° which is easily mass produced.

Still a further object of the invention is to provide a super twisted liquid crystal display device which can be used over a wide temperature range.

Yet a further object of the invention is to provide a super twisted liquid crystal display device having a twist angle of 180°-230° and improved contrast which can be mass produced.

Still other objects and advantages of the invention will in part be obvious and will in part be apparent from the specification.

The invention accordingly comprises the apparatus embodying the features of construction, combinations and arrangement of parts and relation of components, all as exemplified in the detailed disclosure hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
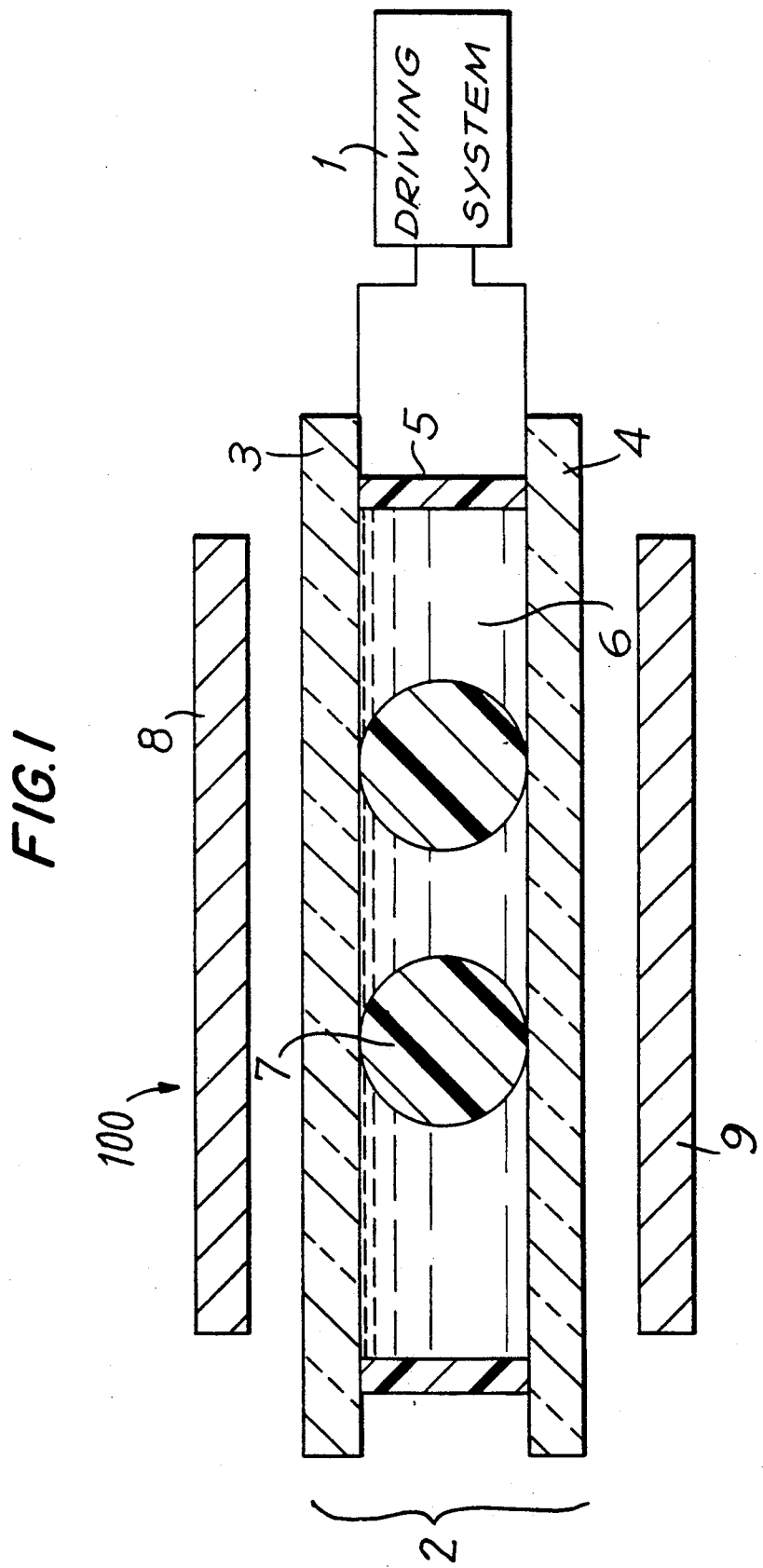
FIG. 1 is a sectional view of a liquid crystal display device in accordance with the invention.

A liquid crystal display device 100 constructed in accordance with the invention is shown in cross-section in FIG. 1. Display device 100 includes a liquid crystal cell 2 having an upper electrode substrate 3 and a lower electrode substrate 4 spaced apart by a spacer 5 about the periphery of the display. A liquid crystal material 6 is disposed between electrode substrates 3 and 4. A plurality of spacers 7 keep the central portions of substrates 3 and 4 at a predetermined distance. Liquid crystal cell 2 is disposed between an upper polarizer 8 and a lower polarizer 9. An optically anisotropic material may be included between upper polarizer 8 and upper electrode substrate 3.

Spacers 7 are formed of an elastic resin material, and may be spherical or rod-like in shape. The elastic resin material is a synthetic resin such as polystyrene, butadiene polymer, polyurethane, chloroprene polymer, vinyl chloride - vinyl acetate copolymer, or the like. A multiplex driving circuit 1 is connected to transparent electrodes on the interior surfaces of substrates 3 and 4 and applies time divisional signals thereto for driving liquid crystal cell 2.

The liquid crystal material is a nematic liquid crystal composition including at least one of a compound [I] and a compound [II] for widening the d/p range and improving (d/p) and at least one of a compound [III] and a compound [IV] for lowering the threshold voltage. Compound [I] is represented by the general formula:

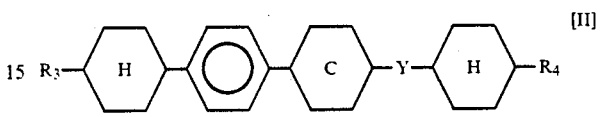
[I]

wherein $R_1$ is R—, RO— or RCH=CH—, $R_2$ is R—, RO—, CN— or F—,

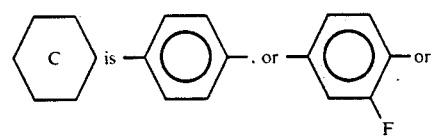

X is a single covalent bond, —C≡C—, —CH$_2$CH$_2$— or —COO—,

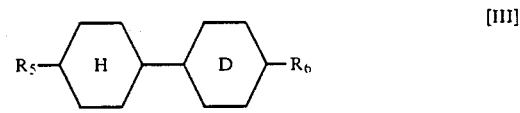

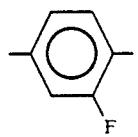

if X is not —CH$_2$CH$_2$—; and R is a linear alkyl group having from 1 to 9 carbon atoms. Compound [II] is represented by the general formula:

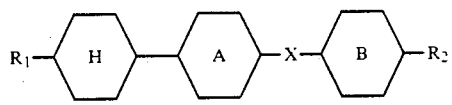
[II]

wherein $R_3$ is R—, RO— or RCH=CH—, $R_4$ is R— or RO—, Y is a single covalent bond or —CH$_2$CH$_2$—,

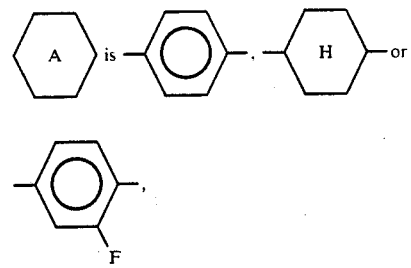

if Y is a single covalent bond, and R is a linear alkyl group having from 1 to 9 carbon atoms. Compound [III] is represented by the general formula:

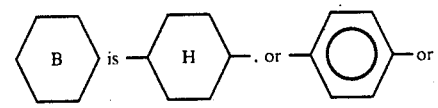
[III]

wherein $R_5$ is R— or RO—,

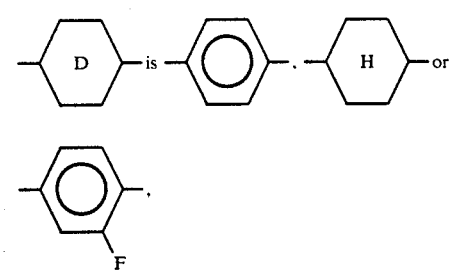

$R_6$ is —CN or F, and R is an alkyl group having from 1 to 9 carbon atoms. Compound [IV] is represented by the general formula:

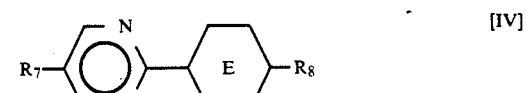
[IV]

wherein $R_7$ is R— or RO—,

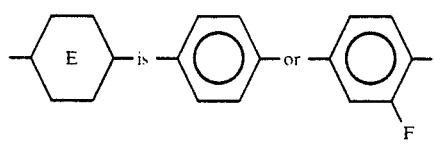

and $R_8$ is —F, or —CN if

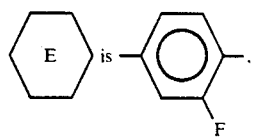

and R is an alkyl group having from 1 to 9 carbon atoms. The composition includes at least 20 weight percent of the total of compounds [I] and compounds [II] between about 5 and 55 weight percent of the total of compounds [III] and compounds [IV].

Figure 3:
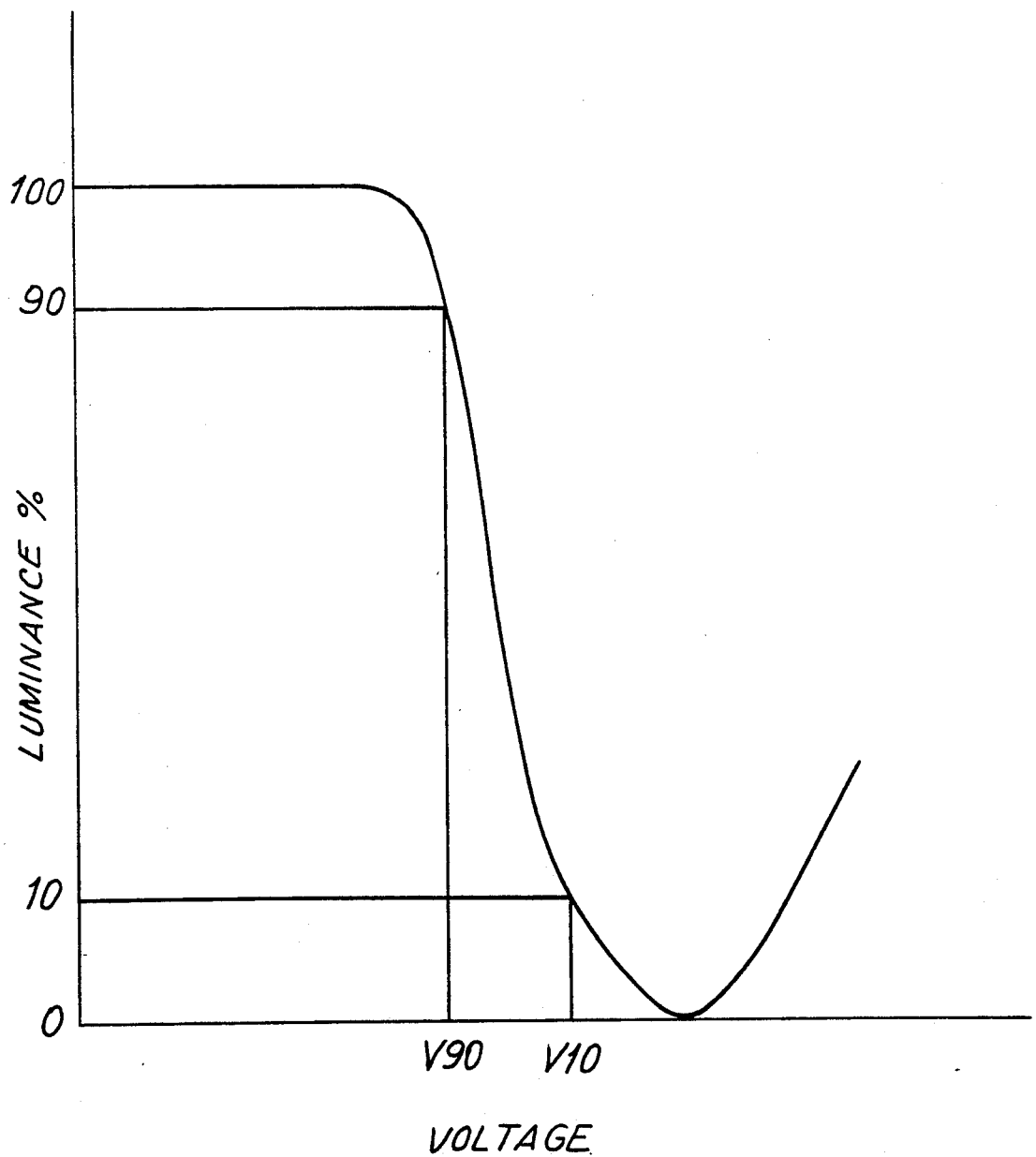
FIG. 3 is a graph illustrating the relationship between luminance and voltage of a multiplex driving system.

FIG. 3 is a graph illustrating the relationship between luminance and voltage for a super twisted liquid crystal display device. The multiplex driving property $\beta$ is defined by the formula:

$$\beta = V_{10}/V_{90}$$

wherein $V_{10}$ is the voltage at 10% luminance and $V_{90}$ is the voltage at 90% luminance. $\beta$ is a value greater than 1 and the multiplex driving property improves as $\beta$ approaches 1.

The difference between d/p at $-10°$ C. and d/p at 60° C., (d/p), is a measure of the temperature dependence of d/p. As (d/p) increases, discrimination lines or fingerprints or the like are easily formed due to a change in temperature and the normal operation of liquid crystal display devices is adversely affected.

The following examples are set forth by way of illustration to show liquid crystal display devices in accordance with the invention. They are set forth for purposes of illustration only and are not intended in a limiting sense.

The d/p ratio for the display device of each of the following Examples is set forth in the following Table 12. The values of $\beta$ are set forth in Table 13 and the $\Delta(d/p)$ is shown in Table 14.

EXAMPLE 1

A liquid crystal display device was fabricated using the liquid crystal composition shown in Table 1 as the liquid crystal material. The spacers were formed of an elastic resin.

TABLE 1

| Compound | Composition ratio (wt %) |
|---|---|
| [I] C₃H₇-⟨H⟩-⟨H⟩-⟨O⟩-F | 10.0 |
| C₂H₅-⟨H⟩-⟨H⟩-⟨O⟩-CH₃ | 10.0 |
| C₃H₇-⟨H⟩-⟨H⟩-⟨O⟩-C₃H₇ | 5.0 |
| C₃H₇-⟨H⟩-⟨H⟩-⟨O⟩-OCH₃ | 5.0 |
| C₂H₅-⟨H⟩-⟨H⟩-⟨O⟩-F | 5.0 |
| C₃H₇-⟨H⟩-⟨H⟩-⟨O⟩-CN (F) | 5.0 |
| [II] C₃H₇-⟨H⟩-⟨O⟩-⟨O⟩-CH₂CH₂-⟨H⟩-C₂H₅ | 5.0 |
| C₃H₇-⟨H⟩-⟨O⟩-⟨O⟩-CH₂CH₂-⟨H⟩-C₄H₉ | 5.0 |

TABLE 1-continued

| Compound | | Composition ratio (wt %) | |
|---|---|---|---|
| [III] | C₃H₇-O⟨H⟩⟨O⟩CN | 5.0 | |
| | C₃H₇⟨H⟩⟨O⟩CN | 5.0 | |
| | C₅H₁₁⟨H⟩⟨O⟩CN | 10.0 | 30.0 |
| [IV] | C₅H₁₁⟨N=N⟩⟨O⟩F | 10.0 | |
| | C₂H₅⟨H⟩⟨O⟩C₃H₇ | 10.0 | |
| | C₂H₅⟨H⟩⟨O⟩C₅H₁₁ | 10.0 | |

The absorption axis of the upper polarizing plate and the rubbing direction of the upper substrate was assumed to be 45 degrees. Similarly, the absorption axis of the lower polarizing plate and the rubbing direction of the lower substrate was assumed to be 45 degrees. In addition, the product Δn×d of the refractive index anisotropy (Δn) of the liquid crystal and the thickness (d) of the liquid crystal layer was about 0.8 μm to 0.9 μm.

EXAMPLE 2

A liquid crystal display device was fabricated in the same manner as in Example 1 using the liquid crystal composition shown in Table 2.

TABLE 2

| Compound | | Composition ratio (wt %) | |
|---|---|---|---|
| [I] | C₃H₇⟨H⟩⟨O⟩C≡C⟨O⟩C₄H₉ | 7.0 | |
| | C₃H₇⟨H⟩⟨O⟩COO⟨O⟩CN | 3.0 | |
| [II] | C₃H₇⟨H⟩⟨O⟩⟨O⟩CH₂CH₂⟨H⟩C₂H₅ | 4.0 | 26.0 |
| | C₃H₇⟨H⟩⟨O⟩⟨O⟩CH₂CH₂⟨H⟩C₄H₉ | 8.0 | |
| | C₅H₁₁⟨H⟩⟨O⟩⟨O⟩⟨H⟩C₅H₁₁ | 4.0 | |
| [III] | C₃H₇⟨H⟩⟨O⟩CN | 20.0 | |
| | C₄H₉⟨H⟩⟨O⟩CN | 20.0 | 54.0 |
| | C₂H₅⟨H⟩⟨H⟩CN | 7.0 | |
| | C₃H₇⟨H⟩⟨H⟩CN | 7.0 | |

TABLE 2-continued

| Compound | | Composition ratio (wt %) |
|---|---|---|
| | CH₃O⟨H⟩⟨H⟩C₈H₁₇ | 14.0 |
| | C₃H₇⟨O⟩C≡C⟨O⟩C₃H₇ | 6.0 |

EXAMPLE 3

A liquid crystal display device was fabricated in the same manner as in Example 1 using the liquid crystal composition shown in Table 3.

TABLE 3

| Compound | | Composition ratio (wt %) | |
|---|---|---|---|
| [I] | C₂H₅⟨H⟩⟨H⟩⟨O⟩F (F) | 9.0 | |
| | C₃H₇⟨H⟩⟨H⟩⟨O⟩F (F) | 12.0 | |
| | C₃H₇⟨H⟩⟨H⟩⟨O⟩CH₃ | 6.5 | |
| | C₃H₇⟨H⟩⟨H⟩⟨O⟩C₃H₇ | 6.5 | 49.0 |
| | C₃H₇⟨H⟩⟨H⟩⟨O⟩OCH₃ | 4.0 | |
| | C₂H₅⟨H⟩⟨H⟩⟨O⟩CN | 5.0 | |
| | C₃H₇⟨H⟩⟨H⟩⟨O⟩CN | 6.0 | |

TABLE 3-continued

| Compound | | Composition ratio (wt %) | |
|---|---|---|---|
| [III] | 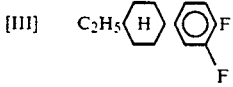 | 10.0 | |
| | 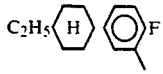 | 10.0 | 20.0 |
| |  | 10.0 | |
| |  | 6.0 | |
| |  | 5.0 | |
| |  | 10.0 | |

EXAMPLE 4

A liquid crystal display device was fabricated in the same manner as in Example 1 using the liquid crystal composition shown in Table 4.

TABLE 4

| Compound | | Composition ratio (wt %) | |
|---|---|---|---|
| [I] | 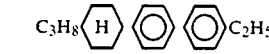 | 13.0 | |
| |  | 10.0 | |
| [II] |  | 4.0 | 33.0 |
| |  | 3.0 | |
| | 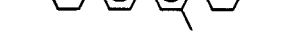 | 3.0 | |
| [III] |  | 5.0 | |
| |  | 15.0 | |
| |  | 10.0 | 55.0 |
| |  | 20.0 | |
| |  | 5.0 | |
| | 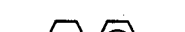 | 12.0 | |

EXAMPLE 5

A liquid crystal display device was fabricated in the same manner as in Example 1 using the liquid crystal composition shown in Table 5.

TABLE 5

| Compound | | Composition ratio (wt %) | |
|---|---|---|---|
| [I] |  | 8.0 | |
| | 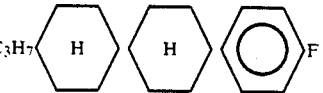 | 12.0 | |
| | 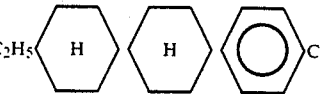 | 10.0 | 74.0 |
| | 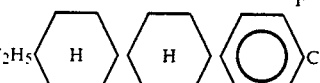 | 10.0 | |
| | 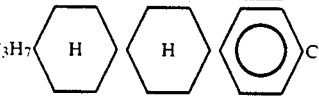 | 10.0 | |
| | 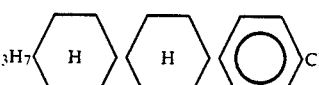 | 8.0 | |
| | 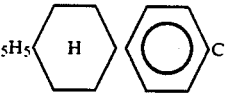 | 8.0 | |
| | 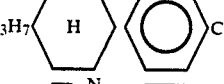 | 8.0 | |
| [III] | 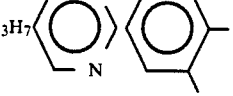 | 8.0 | |
| | C₃H₇–⬡–H–◯–CN | 10.0 | 26.0 |
| [IV] | C₃H₇–(N◯N)–◯–F (F) | 8.0 | |

EXAMPLE 6

A liquid crystal display device was fabricated in the same manner as in Example 1 using the liquid crystal composition shown in Table 6.

TABLE 6
EXAMPLE 7
A liquid crystal display device was fabricated in the same manner as in Example 1 using the liquid crystal composition shown in Table 7.
TABLE 7
TABLE 7-continued
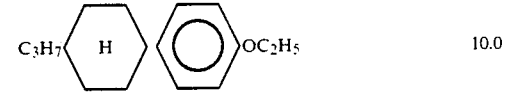

EXAMPLE 8

A liquid crystal display device was fabricated in the same manner as in Example 1 using the liquid crystal composition shown in Table 7.

TABLE 8

| Compound | | Composition ratio (wt %) | |
|---|---|---|---|
| [I] | $C_2H_5$-⬡H-⬡H-◯-$CH_3$ | 4 | |
| | $C_3H_7$-⬡H-⬡H-◯-$CH_3$ | 8 | |
| | $C_3H_7$-⬡H-⬡H-◯-$C_3H_7$ | 2 | |
| | $C_3H_7$-⬡H-⬡H-◯-$OCH_3$ | 4 | 60 |
| | $C_3H_7$-⬡H-⬡H-◯-CN | 5 | |
| | $C_3H_7$-⬡H-◯-COO-◯-F | 10 | |
| | $C_3H_7$-⬡H-⬡H-COO-◯-F | 19 | |

TABLE 8-continued

| Compound | | Composition ratio (wt %) | |
|---|---|---|---|
| [III] | $C_2H_5$-⬡H-◯-CN | 5 | 5 |
| | $C_2H_5O$-⬡H-COO-◯-$CH_3$ | 15 | |
| | $C_4H_9O$-⬡H-COO-◯-$CH_3$ | 10 | |
| | $C_5H_{11}$-⬡H-COO-◯-$CH_3$ | 10 | |

EXAMPLE 9

A liquid crystal display device was fabricated in the same manner as in Example 1 using the liquid crystal composition shown in Table 9.

TABLE 9

| COMPOUND | COMPOSITION RATIO (WT %) | |
|---|---|---|
| $C_2H_5$-⬡H-⬡H-◯-F,F | 8 | |
| $C_3H_7$-⬡H-⬡H-◯-F,F | 12 | |
| $C_2H_5$-⬡H-⬡H-◯-CN,F | 10 | |
| $C_2H_5$-⬡H-⬡H-◯-CN | 10 | 74 |
| $C_3H_7$-⬡H-⬡H-◯-CN | 10 | |
| $C_3H_7$-⬡H-⬡H-◯-$CH_3$ | 8 | |
| $C_3H_7$-⬡H-⬡H-◯-$C_3H_7$ | 8 | |
| $C_3H_7$-⬡H-⬡H-◯-$OCH_3$ | 8 | |

TABLE 9-continued

| COMPOUND | COMPOSITION RATIO (WT %) |
|---|---|
| 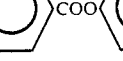 | 8 |
| 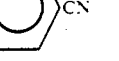 | 8 } 26 |
|  | 10 |

COMPARATIVE EXAMPLE 1

A liquid crystal display device was fabricated in the same manner as in Example 1 except that the spacers were formed of glass fibers. The composition of the liquid crystal material is shown in Table 10.

TABLE 10

| Compound | Composition ratio (wt %) |
|---|---|
|  | 10.0 |
|  | 10.0 |
| 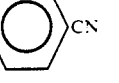 | 10.0 |
| 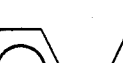 | 10.0 |
|  | 12.0 |
|  | 12.0 |
|  | 14.0 |
| 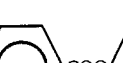 | 6.0 |
| 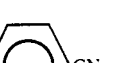 | 10.0 |
| 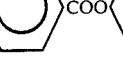 | 6.0 |

COMPARATIVE EXAMPLE 2

A liquid crystal display device was fabricated in the same manner as in Comparative Example 1 and the composition of the liquid crystal material as shown in Table 11.

TABLE 11

| Compound | Composition ratio (wt %) |
|---|---|
| [I] 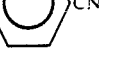 | 8.0 |
| 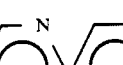 | 8.0 |
|  | 10.0 |
| 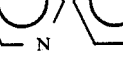 | 10.0 |
| 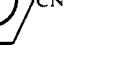 | 9.0 |

TABLE 11-continued

| Compound | Composition ratio (wt %) |
|---|---|
|  C$_7$H$_{15}$—⬡—COO—⬡—CN | 9.0 |
| 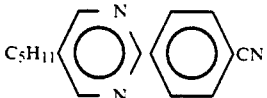 C$_5$H$_{11}$—(N-ring)—⬡—CN | 10.0 |
|  C$_7$H$_{15}$—(N-ring)—⬡—CN | 10.0 |
| 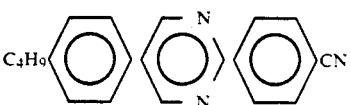 C$_4$H$_9$—⬡—(N-ring)—⬡—CN | 11.0 |
| 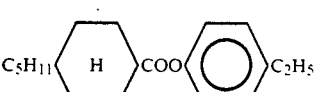 C$_5$H$_{11}$—⬡(H)—COO—⬡—C$_2$H$_5$ | 7.0 |
|  CH$_3$—⬡—⬡—C$_5$H$_{11}$ | 8.0 |

An optical activator, S-811 (manufactured by Merck, Inc.), was added to Examples 1-9 and Comparative Examples 1 and 2 to adjust the twist angles (φ) of the display device to 200°, 250° and 300°. The values of d/p, β and Δ(d/p) for Examples 1-9 and Comparative Examples 1 and 2 at twist angles of 200°, 250° and 300° are shown in Tables 12, 13 and 14, respectively.

TABLE 12

| Twist angle: | d/p | | |
|---|---|---|---|
|  | 200° | 250° | 300° |
| Example |  |  |  |
| 1 | 0.35~0.51 | 0.49~0.58 | 0.68~0.74 |
| 2 | 0.36~0.51 | 0.49~0.58 | 0.68~0.73 |
| 3 | 0.35~0.51 | 0.49~0.58 | 0.69~0.74 |
| 4 | 0.34~0.55 | 0.50~0.59 | 0.68~0.77 |
| 5 | 0.33~0.50 | 0.50~0.58 | 0.68~0.74 |
| 6 | 0.34~0.50 | 0.49~0.56 | 0.67~0.71 |
| 7 | 0.34~0.55 | 0.50~0.59 | 0.67~0.77 |
| 8 | 0.35~0.51 | 0.49~0.58 | 0.68~0.73 |
| 9 | 0.33~0.50 | 0.50~0.59 | 0.68~0.74 |
| Comparative Example |  |  |  |
| 1 | 0.35~0.49 | 0.50~0.57 | 0.69~0.74 |
| 2 | 0.34~0.48 | 0.51~0.56 | 0.69~0.71 |

TABLE 13

| Twist angle | β | | |
|---|---|---|---|
|  | 200° | 250° | 300° |
| Example |  |  |  |
| 1 | 1.085 | 1.055 | 1.022 |
| 2 | 1.075 | 1.030 | 1.010 |
| 3 | 1.090 | 1.052 | 1.015 |
| 4 | 1.099 | 1.061 | 1.031 |
| 5 | 1.087 | 1.044 | 1.020 |
| 6 | 1.082 | 1.039 | 1.011 |
| 7 | 1.091 | 1.051 | 1.011 |
| 8 | 1.077 | 1.033 | 1.009 |
| 9 | 1.079 | 1.039 | 1.017 |
| Comparative Example |  |  |  |
| 1 | 1.123 | 1.077 | 1.055 |
| 2 | 1.109 | 1.075 | 1.050 |

TABLE 14

| Twist angle | Δ(d/p) | | |
|---|---|---|---|
|  | 200° | 250° | 300° |
| Example |  |  |  |
| 1 | 0.01 | 0.02 | 0.02 |
| 2 | 0.03 | 0.03 | 0.03 |
| 3 | 0.01 | 0.02 | 0.02 |
| 4 | 0.02 | 0.02 | 0.02 |
| 5 | 0.01 | 0.02 | 0.02 |
| 6 | 0.01 | 0.02 | 0.02 |
| 7 | 0.02 | 0.02 | 0.01 |
| 8 | 0.01 | 0.02 | 0.02 |
| 9 | 0.02 | 0.03 | 0.03 |
| Comparative Example |  |  |  |
| 1 | 0.04 | 0.05 | 0.05 |
| 2 | 0.04 | 0.05 | 0.04 |

Table 12 shows the range of d/p for Examples 1-9 and Comparative Examples 1 and 2. Although the range of d/p for Examples 1-9 is substantially the same as that for Comparative Examples 1 and 2, the liquid crystal display devices of Examples 1-9 have wider d/p ranges than the liquid crystal display devices of Comparative Examples 1 and 2. Thus, the d/p range for a composition including at least one of compound [III] and compound [IV] can be widened by adding at least one of compound [I] and compound [II].

Table 13 shows the multiplex driving property β for Examples 1-9 and Comparative Examples 1 and 2. Examples 1-9 each have small β values and have excellent multiplex driving properties compared to Comparative Examples 1 and 2. Thus, contrast is improved.

Table 14 shows the dependence of Δ(d/p) on the change in temperature is extremely small for Examples 1-9. In Examples 1-9 no domains were observed when the temperature ranged from −10° C. to 60° C. and the twist angle was 300°. However, domains were formed in Comparative Examples 1 and 2 at −10° C. when the twist angle is 250°. The inherent pitch of the liquid crystal material in Examples 1-9 is less dependent on temperature change compared to the liquid crystal material of Comparative Examples 1 and 2. Additionally, at low temperatures, the elastic resin material utilized in Examples 1-9 has a larger thermal expansion coefficient than the glass fibers utilized in Comparative Examples 1 and 2. At low temperatures the spiral pitch shrinks markedly, and the layer thickness (d) of the liquid crystal material is reduced. Thus, d/p remains constant.

Figure 2:
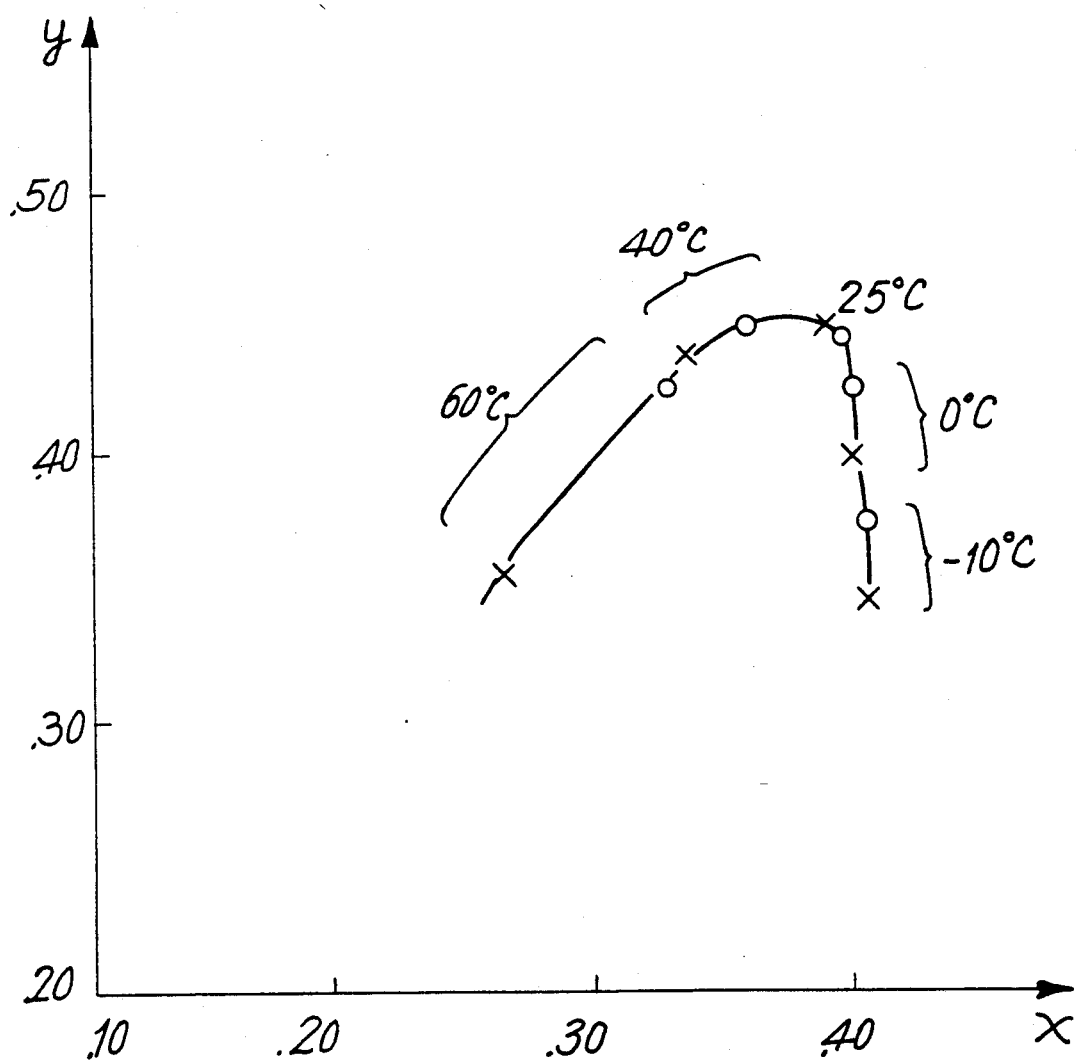
FIG. 2 is a CIE chromaticity diagram illustrating the relationship between the change in coloration and temperature of a liquid crystal display device in accordance with the invention and of a conventional liquid crystal display device.

FIG. 2 shows the relationship between coloration and temperature of the liquid crystal display device of Example 5 and the liquid crystal display device of Comparative Example 1. It is apparent from FIG. 2 that Example 5 exhibits less change in coloration with a change in temperature. This result is also true of Examples 1-4 and 6-9. Accordingly, in the liquid crystal display devices of Examples 1-9 d/p is constant and the change in coloration due to changes in temperature is reduced.

The constant range of d/p over a wide temperature range, allows an increase in the twist angle of the liquid crystal material. This increase in the twist angle is extremely effective for improving contrast. The constant range of d/p over a wide temperature range also results in stable mass production of a liquid crystal material having a twist angle varying between about 180° and 230°. Additionally, the range of d/p is constant over a wide temperature range reducing the change in coloration of the display over a wide temperature range.

As described above, a liquid crystal display device prepared in accordance with the invention includes a liquid crystal cell in which a super twisted nematic liquid crystal material is disposed between a pair of opposed electrode substrates. The liquid crystal material is oriented to have a twist angle between about 180° and 360°. The display device includes at least one compound for reducing the threshold voltage and at least one compound for widening the d/p range.

It will thus be seen that the objects set forth above, among those made apparent from the preceding description, are efficiently attained and, since certain changes may be made in carrying out the above embodiments and in the compositions set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Particularly it is to be understood that in said claims, ingredients or compounds recited in the singular are intended to include compatible mixtures of such ingredients wherever the sense permits.

What is claimed is:

1. A liquid crystal display device, comprising:
a liquid crystal display cell including a pair of spaced apart opposed electrode substrates, a liquid crystal material in the space between the substrates, and spacer means formed from an elastic resin for separating the substrates, the liquid crystal material having a twist angle between about 180° and 360° and having a ratio d/p of layer thickness (d) to spiral pitch (p) of the liquid crystal material related to the twist angle ($\phi$) of the liquid crystal material such that $$\phi/360 - \tfrac{1}{4} < d/p < \phi/360,$$

the liquid crystal material including at least one of a compound (I) and a compound (II), the total amount of Compound (I) and Compound (II) constituting at least 20 weight percent of the liquid crystal material, wherein Compound (I) is represented by the general formula

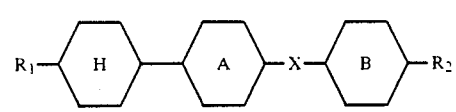

wherein $R_1$ is R—, RO— or RCH=CH—, $R_2$ is R—, RO—, CN— or F—,

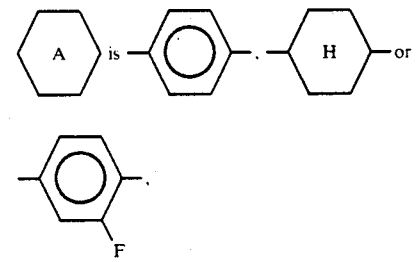

X is a single covalent bond, —C≡C—, —CH$_2$CH$_2$— or —COO—,

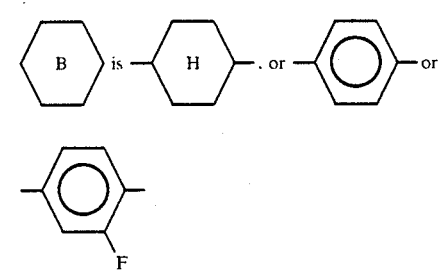

if X is not —CH$_2$CH$_2$—; and R is a linear alkyl group having from 1 to 9 carbon atoms, and Compound (II) is represented by the general formula:

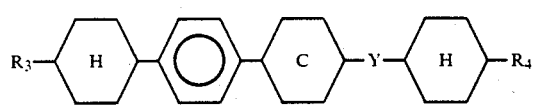

wherein $R_3$ is R—, RO— or RCH=CH—, $R_4$ is R— or RO—, Y is a single covalent bond or CH$_2$CH$_2$,

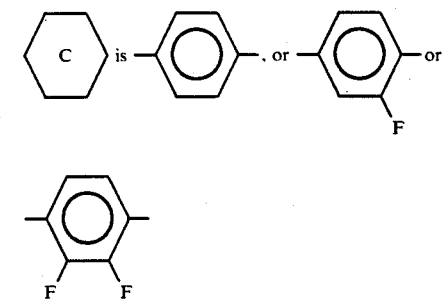

if Y is a single covalent bond, and R is a linear alkyl group having from 1 to 9 carbon atoms; and
at least one of a Compound (III) and a Compound (IV), the total amount of Compound (III) and Compound (IV) constituting between about 5 and 55 weight percent of the liquid crystal material, wherein Compound (III) is represented by the general formula:

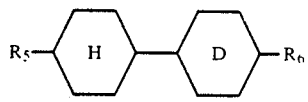

[III]

wherein $R_5$ is R— or RO—,

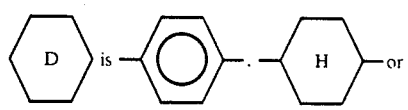

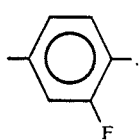

$R_6$ is —CN or F, and R is a linear alkyl group having from 1 to 9 carbon atoms, and Compound (IV) is represented by the general formula:

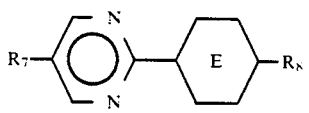

[IV]

wherein $R_7$ is R— or RO—,

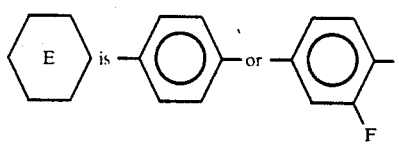

and $R_8$ is —F, or —CN if E is

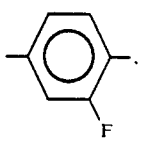

and R is a linear alkyl group having from 1 to 9 carbon atoms; and a pair of linear polarizers, each having an axis of polarization disposed about the liquid crystal cell.

2. The display device of claim 1, wherein the resin is selected from the group consisting of polystyrene, butadiene polymer, polyurethane, chloroprene polymer and vinyl chloride-vinyl acetate copolymer.

* * * * *